US010079942B2

United States Patent
Kim et al.

(10) Patent No.: US 10,079,942 B2
(45) Date of Patent: Sep. 18, 2018

(54) METHODS AND APPARATUS FOR IMPLEMENTING TELEMETRY APPLICATIONS ON A SUBSCRIBER IDENTITY MODULE

(75) Inventors: Dae Seong Kim, Campbell, CA (US); Syed Zaeem Hosain, San Jose, CA (US); Hein Dinh Ho, Morgan Hill, CA (US); Scott D. Pedersen, San Jose, CA (US); David V. Pedersen, Scotts Valley, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 628 days.

(21) Appl. No.: 11/231,003

(22) Filed: Sep. 16, 2005

(65) Prior Publication Data

US 2006/0094467 A1    May 4, 2006

Related U.S. Application Data

(60) Provisional application No. 60/621,300, filed on Oct. 22, 2004.

(51) Int. Cl.
*H04B 1/38* (2015.01)
*H04M 11/00* (2006.01)
*H04W 4/16* (2009.01)

(52) U.S. Cl.
CPC ............ *H04M 11/002* (2013.01); *H04W 4/16* (2013.01)

(58) Field of Classification Search
CPC .............................. H04M 11/002; H04W 4/16
See application file for complete search history.

(56) References Cited

U.S. PATENT DOCUMENTS

| 5,767,790 | A | * | 6/1998 | Jovellana | 340/870.02 |
| 5,845,203 | A | * | 12/1998 | LaDue | 455/414.1 |
| 5,966,653 | A | * | 10/1999 | Joensuu et al. | 455/445 |
| 6,963,740 | B1 | * | 11/2005 | Guthery et al. | 455/410 |
| 2002/0119776 | A1 | * | 8/2002 | Vestergaard et al. | 455/436 |
| 2004/0166839 | A1 | * | 8/2004 | Okkonen et al. | 455/419 |

* cited by examiner

*Primary Examiner* — Steve D Agosta
(74) *Attorney, Agent, or Firm* — Brundidge & Stanger, P.C.

(57) ABSTRACT

Embodiments of the invention provide methods and apparatuses for implementing telemetry applications with the SIM card of a mobile equipment. For one embodiment of the invention the telemetry application allows the encoding of TAD within a supplementary services message and transmission of the TAD over a control channel of a GMS telecommunications system. For one embodiment of the invention the telemetry application allows the decoding of caller identification message received from a CMS to obtain the TAD.

8 Claims, 6 Drawing Sheets

METHODS AND APPARATUS FOR IMPLEMENTING TELEMETRY APPLICATIONS ON A SUBSCRIBER IDENTITY MODULE

CROSS REFERENCE TO RELATED APPLICATION

This application claims the benefit of U.S. provisional patent application No. 60/621,300 entitled "Methods and Apparatus for Implementing Telemetry Applications on a Subscriber Identity Module", filed Oct. 22, 2004.

FIELD

Embodiments of the invention relate generally to the field of telemetry applications employing a wireless telecommunications system and more specifically to methods and apparatuses for implementing a telemetry application on a subscriber identity module (SIM (SIM card)).

BACKGROUND

Wireless telemetry systems use a wireless (e.g., radio frequency) communications network to allow the measurement of information by remote devices and the transmission of the measured to a central monitoring station (CMS). Typical wireless telemetry systems also enable the control of remote device through the counter part of telemetry, telecommand.

In general, telemetry systems are employed for the purpose of monitoring environmental conditions or equipment parameters. Such systems are employed in a wide variety of applications including security, health monitoring, vehicle and asset tracking, and device and equipment monitoring and control.

A typical telemetry system includes a number of remote measuring devices, an encoder for encoding the measurements as analog or digital communication signals, and a transmission means for transmitting the communication signals.

Some telemetry systems use a wireless telecommunications system to transmit the telemetry application data. To effect such a system, the mobile equipment of the telecommunication system is controlled by a telemetry application. Typically the telemetry application is programmed into firmware of the mobile equipment.

Telemetry applications provide the ability for a telemetry device to obtain measurement data at remote location and transmit the data over a wireless network to a central monitoring station. Such applications are considered machine-to-machine applications as no human user is involved. That is, for such applications, the data is input from a machine connected to the mobile station and not from a human user of the mobile station.

An exemplary telemetry application providing a method for communicating telemetry application data (TAD) over a control channel of a wireless communication network is described in U.S. Pat. No. 5,845,203 to Ladue ('203 Patent). As described in the '203 Patent, TAD from a remote device is encoded in a stream of dialed digits along with a remote feature control request (RFCR). The telemetry application described in the '203 Patent exploits the RFCR to transmit TAD from the remote device to the CMS. The remote device is assigned a Mobile Identification Number (MIN) so that it appears as a roaming cell phone to a local MSC. The local MSC then, acts as the serving MSC for remote device. The area code specified in the assigned MIN is selected so that the CMS functions as the HLR associated with the home MSC for the remote device. The CMS further appears as a service control point (SCP) on the SS7 network to receive the RFCR and TAD automatically forwarded by the serving MSC.

This is effected as follows. An RFCR is placed in the dialed digits stream accompanying a call origination message initiated by the wireless communicator. Additionally, TAD is also placed in the dialed digits stream. The call origination message and dialed digits stream is transmitted over a control channel to the serving MSC. The serving MSC receives the call origination message and associated dialed digits stream, and detects the RFCR, triggering the serving MSC to forward the dialed digits stream, including the RFCR and the application specific data, over the SS7 network, to the CMS/SCP on the SS7 network.

As evident from this example, telemetry applications may be quite sophisticated which results in a substantial disadvantage. As note above the telemetry application may be programmed in firmware in the mobile equipment. This means that providers of telemetry applications have to approach mobile equipment manufacturers independently to have the telemetry application implemented within each type of mobile equipment. Therefore such a scheme is time-consuming and costly. Moreover, this may contribute to inconsistencies in the telemetry applications between mobile equipment manufacturers.

SUMMARY

Embodiments of the invention provide methods and apparatuses for implementing telemetry applications with the SIM card of a mobile equipment. For one embodiment of the invention the telemetry application allows the encoding of TAD within a supplementary services message and transmission of the TAD over a control channel of a GMS telecommunications system. For one embodiment of the invention the telemetry application allows the decoding of caller identification message received from a CMS to obtain the TAD.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Mobile stations of telecommunications systems typically include a SIM card. The SIM card, which is coupled to, but physically separate from the mobile equipment (transceiver) of the mobile station is a machine-readable media containing the subscriber identity information allowing the subscriber to be identified by the network. This allows the subscriber access to subscribed services irrespective of the specific mobile equipment. That is, by inserting the SIM card into another GSM terminal, the user is able to transport services to that terminal (e.g., placing and receiving calls as well as other subscribed services). The SIM card typically stores a security key to protect against unauthorized use. Originally, the SIM cards were implemented to store account information for a particular user and were not much more than a data storage medium. Removable and portable SIM cards allow a user to transport their account information from one mobile station to another.

Over the years the SIM card has evolved from a simple storage device to include coded programs implemented on the SIM card. For example, the SIM card can now implement menus such that the SIM card can invoke an action of the mobile equipment (alarms, sounds, etc.)

Programs can be implemented on the SIM card in a variety of ways. For example, the GSM standard provides a SIM Application Toolkit (SAT) (also referred to as a SIM Toolkit (STK)) that is programmed into the SIM card. The SAT provides mechanisms that allow applications implemented on the SIM card to operate in conjunction with mobile equipment that supports the SAT. Such consumer applications include, for example, financial service (e.g., banking), and service dialing number, among many others.

Recently, proactive SIM capabilities have provided the SIM card with the ability to intercept an event and take a specified action. That is, using proactive SIM capabilities, the SIM card can initiates commands to effect applications independently of the mobile equipment or the wireless communications network. For example, the SIM card may be programmed to recognize a number and, in response to the number being dialed, effect a specified action such as barring the number or automatically changing the number dialed.

The applications implemented on a SIM card have been heretofore restricted to consumer applications in which a human uses the mobile equipment to obtain provide information. SIM capabilities have not, thus far, been used to implement a machine-to-machine application (e.g., a telemetry application) on a SIM card of a mobile station.

In accordance with one embodiment of the invention, a telemetry application is implemented on SIM card of a mobile station using available SIM facilities provided by the wireless telecommunications standard. For one embodiment, an SAT is used to implement a telemetry application, including modifications or invocations of standard GSM functions, on a SIM card of a mobile station of a GSM telecommunications system.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
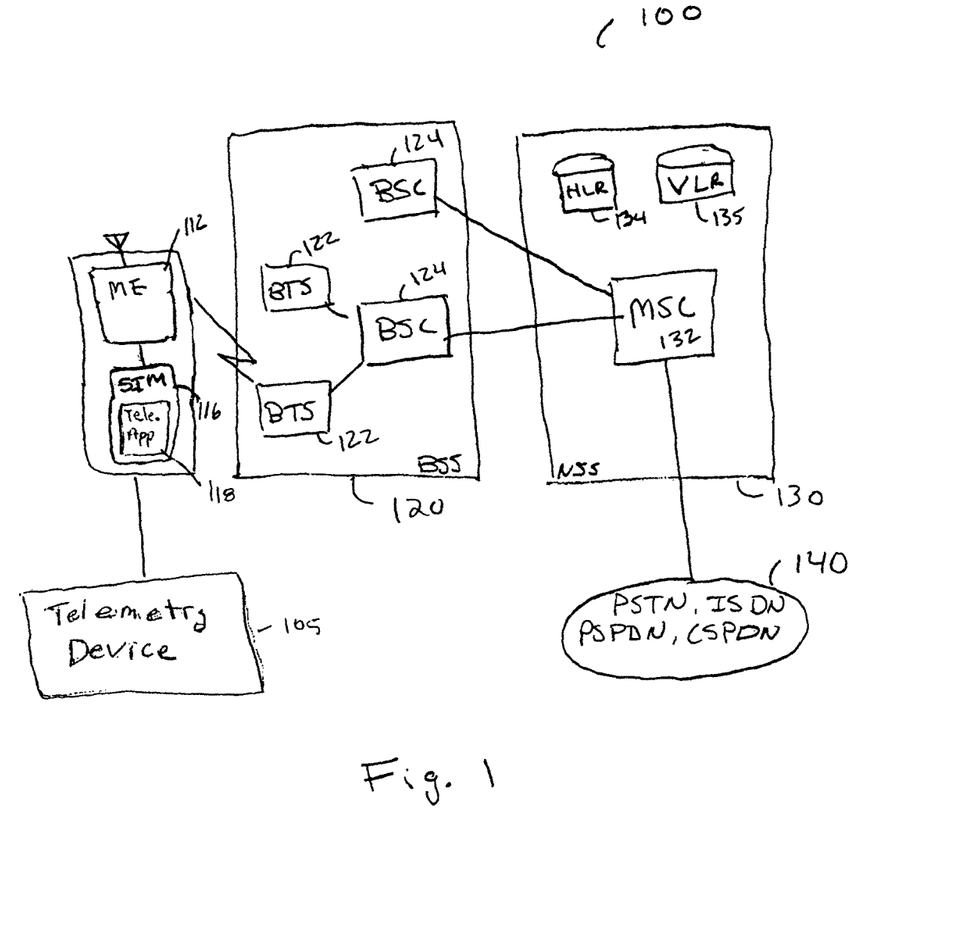
FIG. 1 illustrates a portion of a GMS telecommunication network in accordance with one embodiment of the invention.

FIG. 1 illustrates a portion of a GMS telecommunication network in accordance with one embodiment of the invention. Network 100, shown in FIG. 1 includes a mobile station 110. The mobile station 110 includes the mobile equipment (transceiver) 112. In accordance with one embodiment of the invention the mobile equipment 112 is communicatively coupled to a telemetry device 105.

The mobile station 110 also includes a SIM card 116 having implemented thereon a telemetry application 118 in accordance with one embodiment of the invention.

In accordance with one embodiment of the invention the telemetry application implemented on the SIM card 118 effects a method for transmitting TAD over a control channel of a GSM telecommunications system as described in related U.S. patent application Ser. No. "TBD", entitled "Methods and Apparatuses for Providing Application-Specific Messaging Over a Global System for Mobile Wireless Communication System", filed on "Oct. 22, 2004". For purposes of illustration, the telemetry application described therein will be used to illustrate an embodiment of the invention.

Referring again to FIG. 1, the mobile station 110 communicates with the base station subsystem (BSS) 120 via a GSM-compatible transmission format (ETSI). BSS 120 includes a number of base transceiver stations (BTSs) 122. The BTSs 122 comprise the radio transceivers that define a cell of the network, as well as handle the radio-link protocols with the mobile station 110. The BSS 120 also includes a number of base station controllers (BSCs) 124 that manage the radio resources for one or more BTSs 122. The BSCs 124 effect such operations as radio-channel setup, frequency hopping, and handovers. As shown in FIG. 1, the BSCs 124 connect the mobile station 110 to the mobile switching center (MSC) 132 of network subsystem (NSS) 130. The MSC 132 provides the functionality for handling a mobile subscriber including registration, authentication, location updating, handovers, and call routing to a roaming subscriber. The MSC 132 also provides connection to the fixed networks 140 (shown for example, as PSTN, ISDN, PSPDN, and CSPDN).

The MSC 132 provides its services in conjunction with a number of functional entities including the home location register (HLR) 134 and the visitor location register (VLR) 135 which, together with the MSC 132 provide call-routing and roaming capabilities. The HLR maintains the current location of the mobile station along with administrative information for each registered subscriber of the GSM network.

The VLR 135 contains information to control and provision services for each mobile station located within the geographical area controlled by the VLR 135.

The GSM network employs two channel types; traffic channels (TCHs) used to transmit speech and data, and control channels (CCHs) used for signaling. The control channels include the random access channel (RACH), which is used by the mobile station to request access to the network including requests for supplementary services (SS). Supplementary services modifies (supplements) basic telecommunication service. When the mobile station transmits an SS request the system assigns a standalone dedicated control channel (SDCCH) to the mobile station for access to the network.

The control channels also include the paging channel (PCH used to alert the mobile station of an in-coming call.

Figure 2:
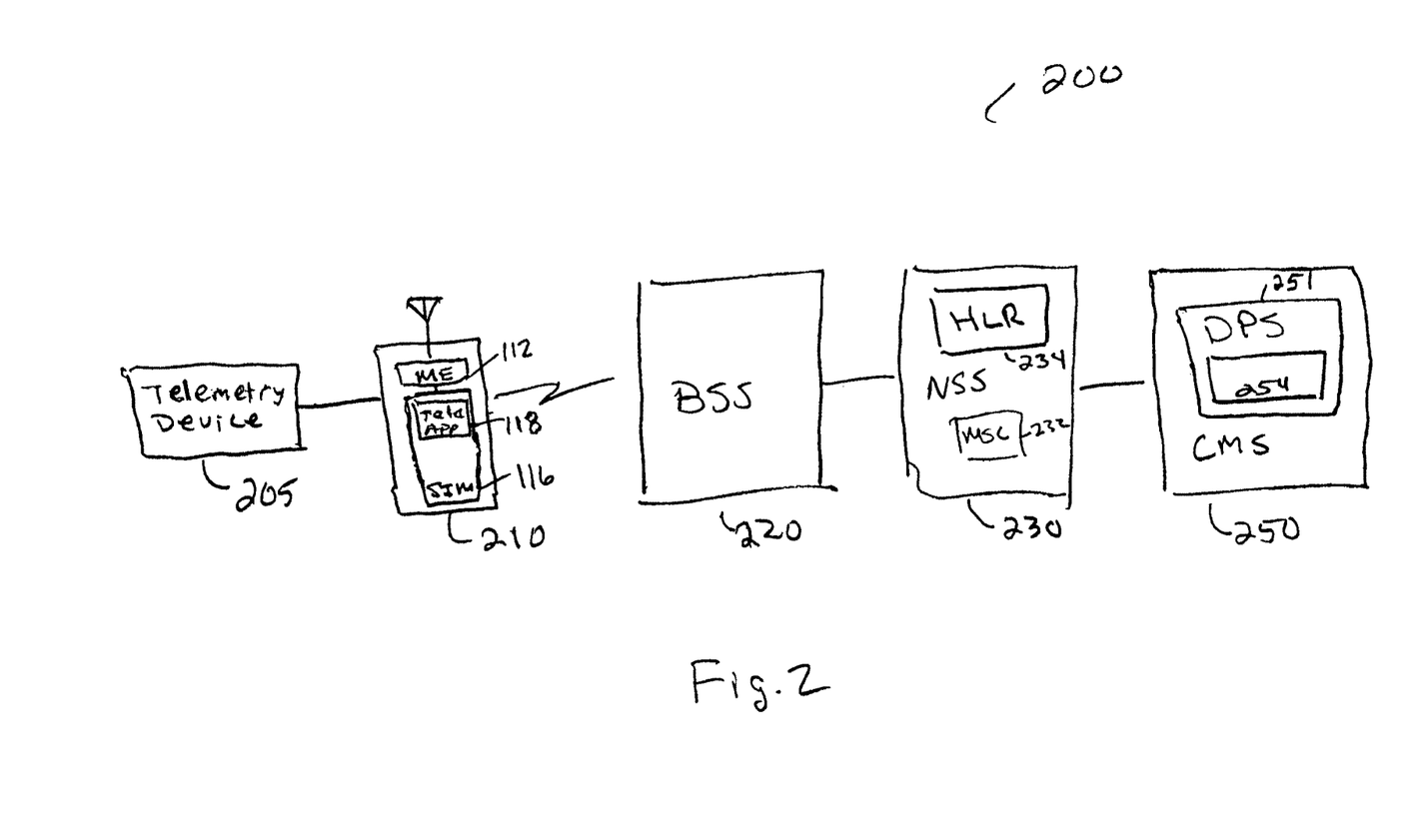
FIG. 2 illustrates a system in which a telemetry application is implemented on the SIM card of a mobile station of a GSM telecommunication system in accordance with one embodiment of the invention.

In accordance with one embodiment of the invention, a telemetry application that allows TAD to be transmitted within an SS message on the allocated SDCCH, as described more fully below, is implemented on the SIM card of the mobile station. 100361 FIG. 2 illustrates a system in which a telemetry application is implemented on the SIM card of a mobile station of a GSM telecommunication system in accordance with one embodiment of the invention. System 200, shown in FIG. 2 includes a telemetry device 205. Telemetry device 205 is coupled to mobile station 210. The telemetry device 205 communicates TAD data to the mobile station 210. The SIM card 116 of mobile station 210 includes a telemetry application 118. The telemetry application 118 encodes the TAD as an SS message and transmits it through the BSS 220 to the NSS 230 on an allocated SDCCH. The MSC 232 receives the SS message and invokes the appropriate interface message. The SS message is then forwarded to the HLR.

The GSM mobile application port (MAP) (GSM_MAP) sends the SS message using a MAP_Register_SS message to the HLR 234. Software in the HLR 234 understands the GSM_MAP.

The HLR receives the SS message, formats the message in a desired transmission protocol and forwards the data to the CMS 250. That is, software on the HLR converts the message from the SS message format to, for example, TCP/IP format. The message may be communicated through direct or indirect communication links as exemplified above. The CMS 250 may include a digital processing system (DPS) 251 for processing (e.g., decoding) the received message to obtain the TAD. DPS 251 may also include a telemetry application 254 for transmitting TAD from the CMS 250 to the telemetry device 205. The CMS 250 may communicate the TAD to external systems (not shown) for additional processing or actions.

Figure 3:
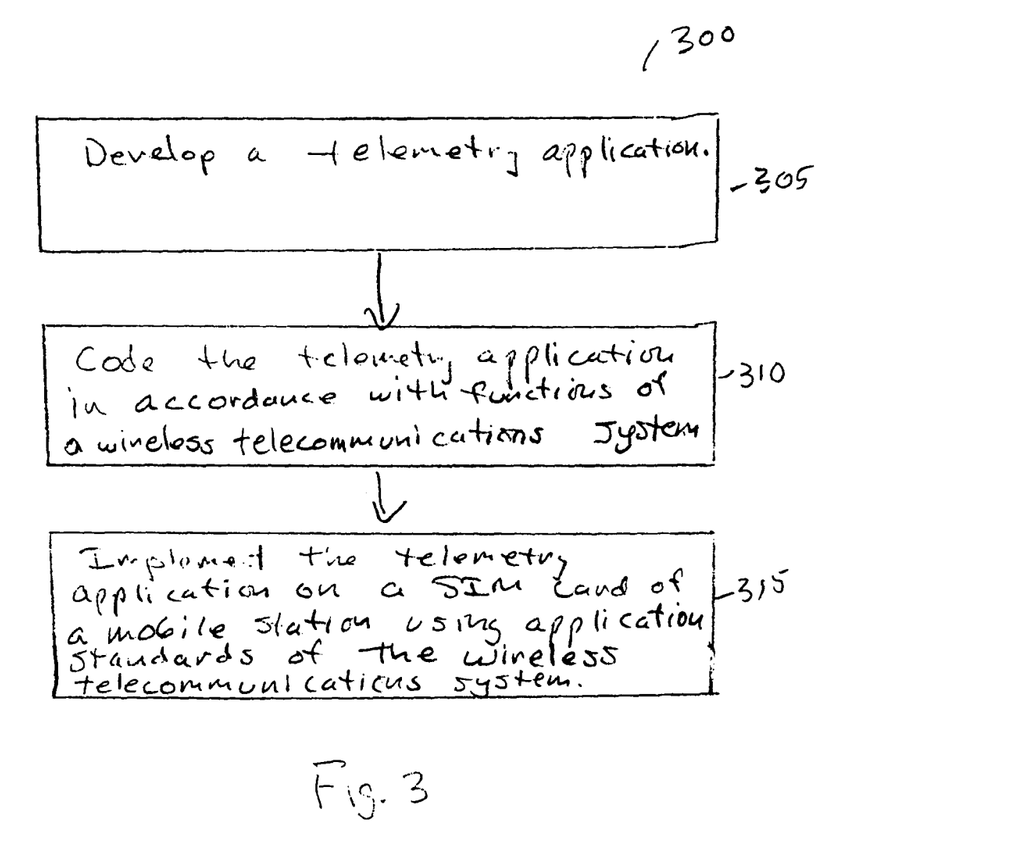
FIG. 3 illustrates a process by which a telemetry application is implemented on SIM of a mobile station in accordance with one embodiment of the invention.

FIG. 3 illustrates a process by which a telemetry application is implemented on SIM of a mobile station in accordance with one embodiment of the invention. Process 300 begins at operation 305 in which a telemetry application is developed At operation 310 the telemetry application is coded as modifications or invocations of functions of a particular wireless telecommunications system. For one embodiment of the invention the telemetry application consists of modifications or invocations of GSM functions.

At operation 315 the coded telemetry application is implemented on the SIM card of a mobile station using application standards of the wireless communication system. For one embodiment of the invention, the telemetry application is implemented using a GSM SAT.

General Matters

Embodiments of the invention provide methods and apparatuses for implementing a telemetry application on a SIM card of a mobile station. Though described in relation to a GSM telecommunications system, embodiments of the invention are equally applicable to other telecommunications systems that include SIM card programming capabilities.

Figure 5:
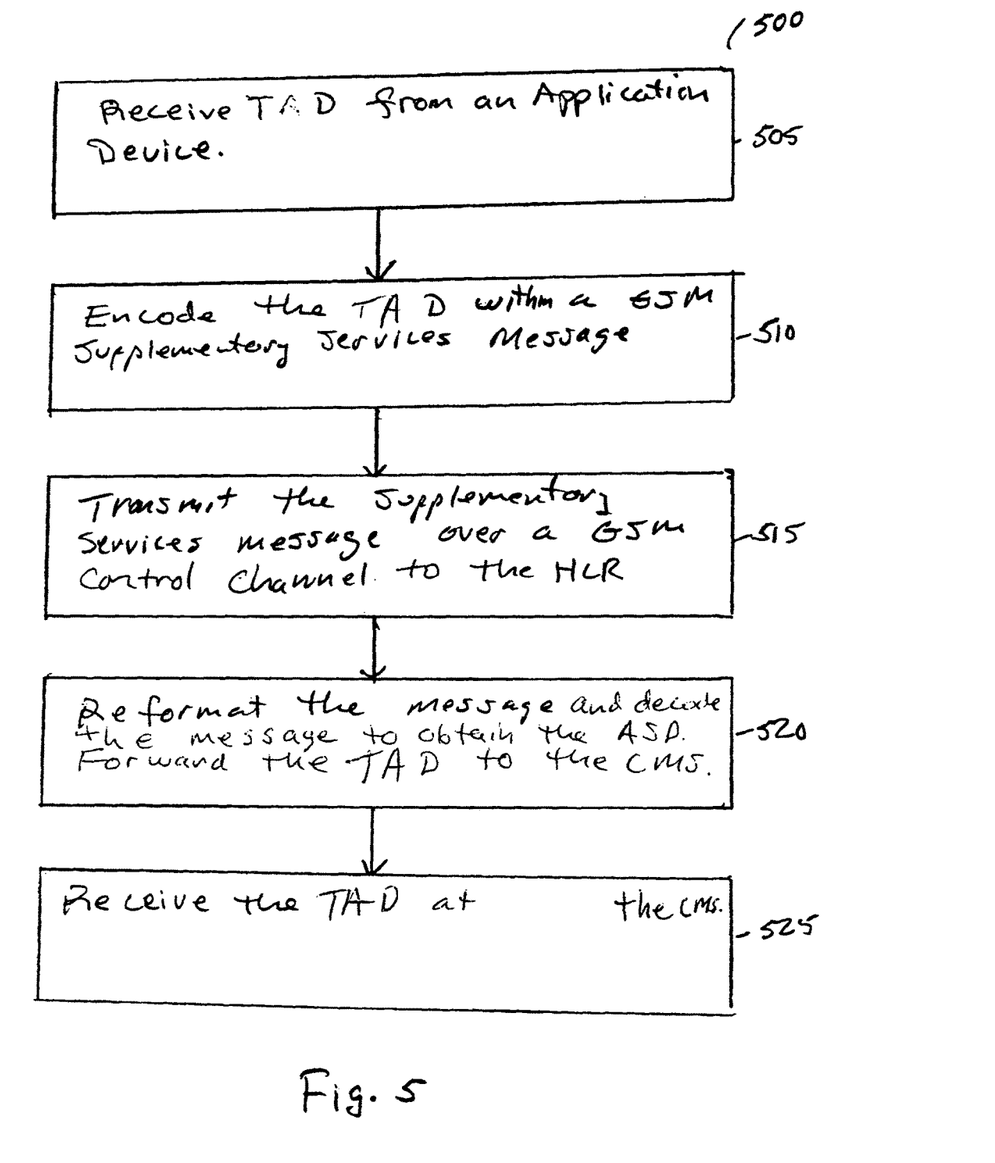
FIGS. 5 and 6 illustrate methods by which a telemetry application is implemented on a SIM in accordance with embodiments of the invention.
Figure 6:
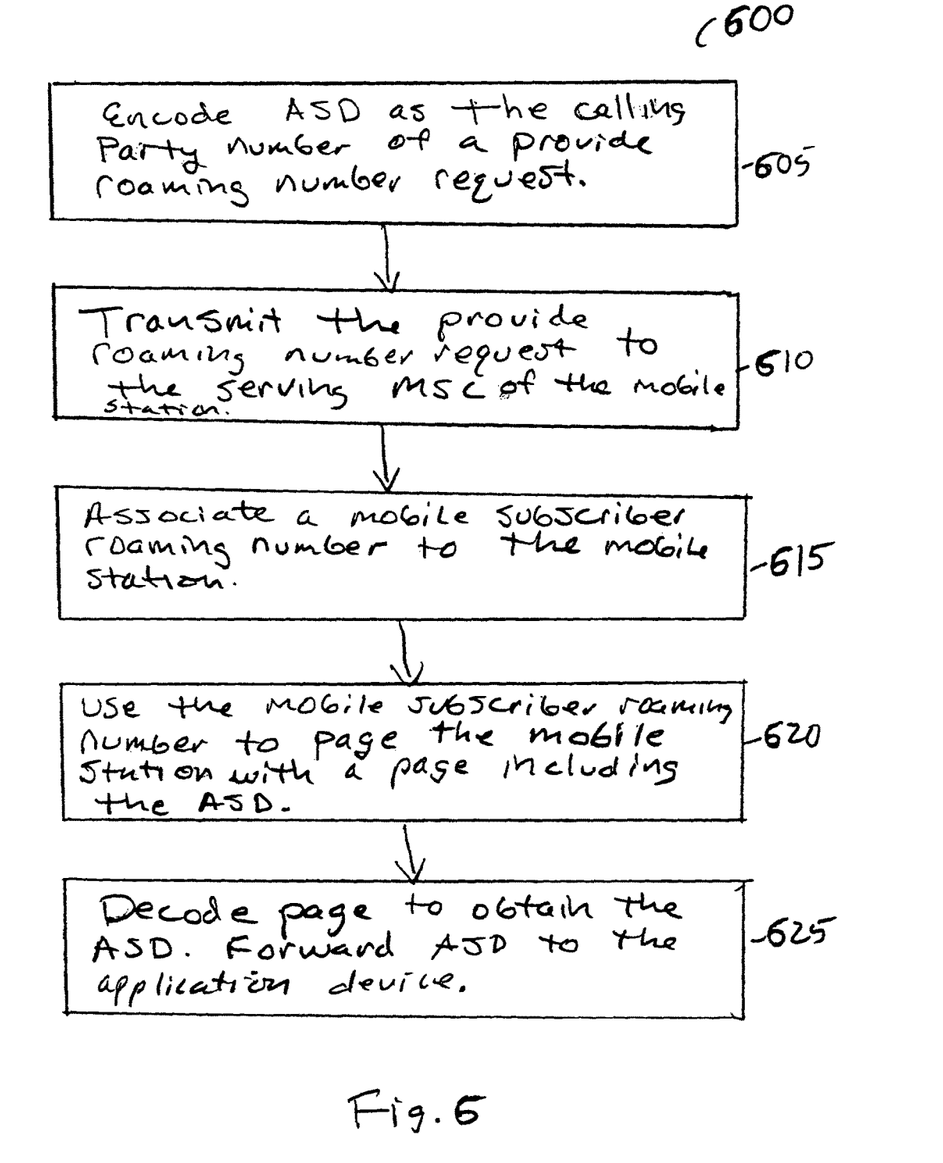

In accordance with alternative embodiments various telemetry applications may be implemented on a SIM Card. Two exemplary telemetry applications that may be implemented on a SIM card are included as FIG. 5 (Steps 500 to 525) and FIG. 6 (Steps 600 to 625), submitted as Appendix A.

Figure 4:
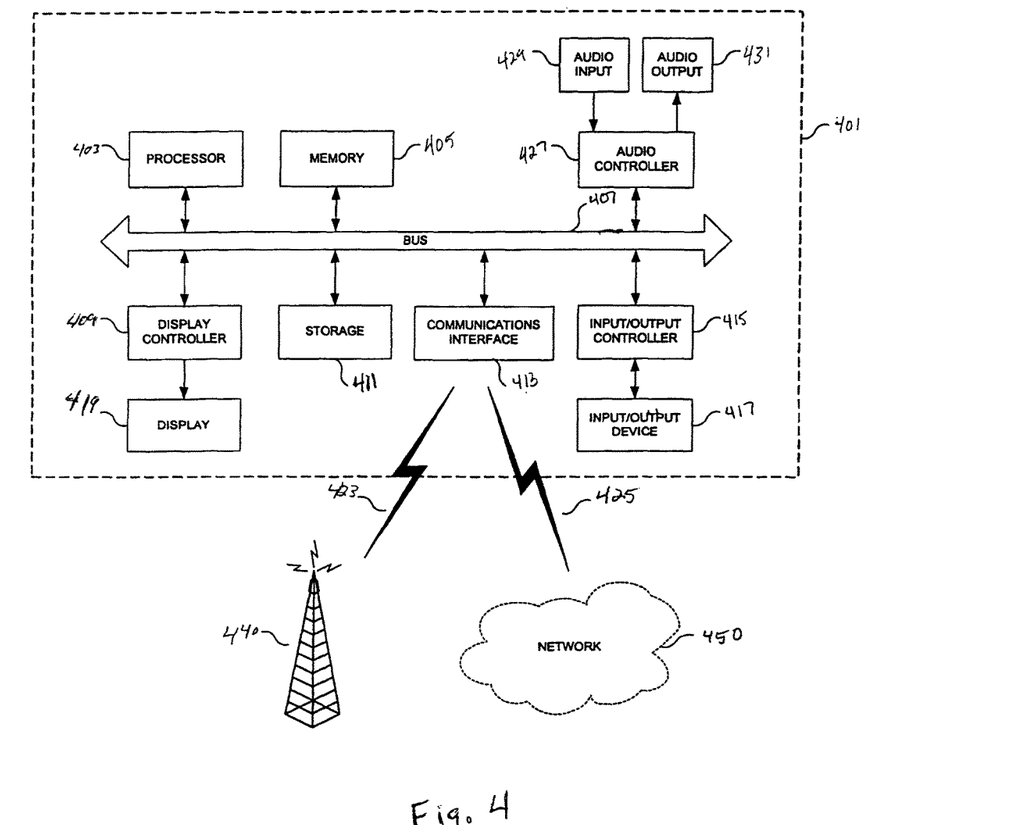
FIG. 4 illustrates a system by which a telemetry application is implemented on a SIM in accordance with one embodiment of the invention.

As described above in reference to FIG. 2, the central monitoring station may include a DPS. FIG. 4 is a block diagram illustrating one embodiment of a DPS 401 that may be included within the central monitoring station in accordance with an embodiment of the present invention. For alternative embodiments of the present invention, DPS 401 may be a computer that includes a processor 403 coupled to a bus 407. In one embodiment, memory 405, storage 411, display controller 409, communications interface 413, input/output controller 415 and audio controller 427 are also coupled to bus 407.

DPS 401 interfaces to external systems through communications interface 413. Communications interface 413 may include a radio transceiver compatible with AM, FM, TV, wireless telephone signals or the like. Communications interface 413 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

For one embodiment of the present invention, a carrier wave signal 423 is received by communications interface 413 to communicate with antenna 440. In one embodiment of the present invention, carrier wave signal 425 is received/transmitted between communications interface 413 and network 450. In one embodiment of the present invention, a communications signal 425 may be used to interface DPS 401 with another computer system, a network hub, router or the like. In one embodiment of the present invention, carrier wave signals 423 and 425 are considered to be machine readable media, which may be transmitted through wires, cables, optical fibers or through the atmosphere, or the like.

In one embodiment of the present invention, processor 403 may be a conventional microprocessor, such as for example but not limited to an Intel x86 or Pentium family microprocessor, a Motorola family microprocessor, or the like. Memory 405 may be a machine-readable medium such as dynamic random access memory (DRAM) and may include static random access memory (SRAM). Display controller 409 controls in a conventional manner a display 419, which in one embodiment of the invention may be a cathode ray tube (CRT), a liquid crystal display (LCD), an active matrix display, a television monitor or the like. The input/output device 417 coupled to input/output controller 415 may be a keyboard, disk drive, printer, scanner and other input and output devices, including a television remote, mouse, trackball, trackpad, joystick, or the like. In one embodiment of the present invention, audio controller 427 controls in a conventional manner audio output 431, which may include for example audio speakers, headphones, an audio receiver, amplifier or the like. In one embodiment of the invention, audio controller 427 also controls in a conventional manner audio input 429, which may include for example a microphone or input(s) from an audio or musical device, or the like.

Storage 411 may include machine-readable media such as for example but not limited to a magnetic hard disk, a floppy disk, an optical disk, a smart card or another form of storage for data. In one embodiment of the present invention, storage 411 may include removable media, read-only media, readable/writable media or the like. Some of the data may be written by a direct memory access process into memory 405 during execution of software in computer system 401. It is appreciated that software may reside in storage 411, memory 405 or may be transmitted or received via modem or communications interface 413. For the purposes of the specification, the term "machine readable medium" shall be taken to include any medium that is capable of storing data, information or encoding a sequence of instructions for execution by processor 403 to cause processor 403 to perform the methodologies of the present invention. The term "machine readable medium" shall be taken to include, but is not limited to solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A mobile station, to operate in a wireless telecommunications system, comprising:
   a telemetry device to collect telemetry application data;
   a mobile equipment communicably interfaced with the telemetry device and enabled to communicate with a remote location via the wireless telecommunications system;
   a subscriber identity module (SIM) coupled with the mobile equipment, having a telemetry application implemented thereon, the telemetry application to receive the telemetry application data from the telemetry device via the mobile equipment and cause the mobile equipment to transmit the telemetry application data to the remote location via the wireless telecommunications system,
   wherein the telemetry application to further encode the telemetry application data within a supplementary services message; and
   wherein the supplementary services message comprises a call forwarding message selected from the group comprising:
   a call forwarding unconditional message,
   a call forwarding on mobile subscriber busy message,
   a call forwarding on no reply message, and
   a call forwarding on mobile subscriber unreachable message.

2. The mobile station of claim 1, wherein the mobile equipment to transmit the supplementary services message over the control channel of the wireless telecommunications system comprises the mobile equipment to transmit the call forwarding message over a standalone dedicated control channel of the wireless telecommunications system.

3. The mobile station of claim 1, wherein the telemetry application data is included in a forward-to-number of the call forwarding message.

4. A method in a mobile equipment comprising:
   executing a telemetry application stored within a subscriber identity module (SIM) coupled with the mobile equipment, wherein the telemetry application causes the mobile equipment to perform operations comprising:
   receiving telemetry application data from a telemetry device communicably interfaced with the mobile equipment, wherein the telemetry application data comprises measurement data collected by the telemetry device,
   encoding the telemetry application data within a supplementary services message of a wireless communications system accessible to the mobile equipment; and
   transmitting the supplementary services message to a remote location via the wireless communications system,
   wherein the supplementary services message comprises a call forwarding message selected from the group comprising:
   a call forwarding unconditional message,
   a call forwarding on mobile subscriber busy message,
   a call forwarding on no reply message, and
   a call forwarding on mobile subscriber unreachable message; and
   wherein transmitting the supplementary service message over the control channel of the wireless communications system comprises transmitting the call forwarding message over a standalone dedicated control channel of the wireless communications system.

5. A method in a mobile equipment comprising:
   executing a telemetry application stored within a subscriber identity module (SIM) coupled with the mobile equipment, wherein the telemetry application causes the mobile equipment to perform operations comprising:
   receiving telemetry application data from a telemetry device communicably interfaced with the mobile equipment, wherein the telemetry application data comprises measurement data collected by the telemetry device,
      encoding the telemetry application data within a supplementary services message of a wireless communications system accessible to the mobile equipment; and
      transmitting the supplementary services message to a remote location via the wireless communications system,
      wherein the supplementary services message comprises a call forwarding message selected from the group comprising:
      a call forwarding unconditional message,
      a call forwarding on mobile subscriber busy message,
      a call forwarding on no reply message, and
      a call forwarding on mobile subscriber unreachable message; and
      wherein the telemetry application data is included in a forward-to-number of the call forwarding message.

6. A mobile station, to operate in a wireless communications network, comprising:
   means for accessing a telemetry application from a subscriber identity module (SIM) card coupled with a mobile equipment of the mobile station; and
   means for executing the telemetry application from the SIM card via the mobile equipment,
   wherein the telemetry application comprises:
   means for collecting telemetry application data at the mobile station via a telemetry device communicably interfaced with the mobile equipment, and means for transmitting the telemetry application data to a remote location over the wireless communications network via the mobile equipment, wherein the telemetry application further comprises:

means for encoding the telemetry application data within a supplementary services message;

wherein the means for transmitting the telemetry application data to the remote location comprises:

means for transmitting the supplementary service message over a control channel of the wireless communications network to a central monitoring station; and wherein the supplementary services message comprises a call forwarding message selected from the group comprising:

a call forwarding unconditional message;

a call forwarding on mobile subscriber busy message;

a call forwarding on no reply message; and a call forwarding on mobile subscriber unreachable message.

7. The mobile station of claim 6, wherein transmitting the supplementary service message over a control channel of the wireless communications network comprises:

means for transmitting the call forwarding message over a standalone dedicated control channel of the wireless communications network.

8. The mobile station of claim 6, wherein the telemetry application data is included in a forward-to-number of the call forwarding message.

* * * * *